US 8,697,307 B2

(12) United States Patent
Park et al.

(10) Patent No.: US 8,697,307 B2
(45) Date of Patent: Apr. 15, 2014

(54) SOLID OXIDE FUEL CELL STACK

(75) Inventors: Kwang-Jin Park, Yongin-si (KR); Hyun Soh, Yongin-si (KR); Tae-Ho Kwon, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 38 days.

(21) Appl. No.: 13/328,620

(22) Filed: Dec. 16, 2011

(65) Prior Publication Data
US 2013/0045435 A1 Feb. 21, 2013

(30) Foreign Application Priority Data

Aug. 17, 2011 (KR) .................. 10-2011-0081785

(51) Int. Cl.
*H01M 8/24* (2006.01)
*H01M 8/02* (2006.01)

(52) U.S. Cl.
CPC ............ *H01M 8/243* (2013.01); *H01M 8/2425* (2013.01); *H01M 8/0202* (2013.01); *H01M 8/0252* (2013.01)
USPC ........... 429/466; 429/452; 429/465; 429/479; 429/488

(58) Field of Classification Search
USPC .......................... 429/488, 489, 495, 496, 509
See application file for complete search history.

(56) References Cited

U.S. PATENT DOCUMENTS

| | | | | |
|---|---|---|---|---|
| 6,106,966 | A * | 8/2000 | Crow | 429/442 |
| 6,399,232 | B1 * | 6/2002 | Eshraghi | 429/453 |
| 2003/0148160 | A1 * | 8/2003 | Song et al. | 429/31 |
| 2008/0241625 | A1 * | 10/2008 | Fujinaga | 429/30 |
| 2010/0062297 | A1 * | 3/2010 | Hafemeister et al. | 429/19 |
| 2010/0098977 | A1 | 4/2010 | Ryu et al. | |
| 2010/0203414 | A1 * | 8/2010 | Ooshima et al. | 429/458 |

FOREIGN PATENT DOCUMENTS

| | | |
|---|---|---|
| JP | 2000-058101 | 2/2000 |
| JP | 4282109 B2 | 6/2009 |
| JP | 2010-103076 A | 5/2010 |
| KR | 10-2008-0095525 A | 10/2008 |

OTHER PUBLICATIONS

Patent Abstracts of Japan for Japanese Publication 11-339836, dated Dec. 10, 1999, corresponding to Japanese Patent 4282109 listed above.
KIPO Office action dated Dec. 31, 2012, for Korean priority Patent application 10-2011-0081785, (3 pages).

* cited by examiner

*Primary Examiner* — Ula C Ruddock
*Assistant Examiner* — Scott J Chmielecki
(74) *Attorney, Agent, or Firm* — Christie, Parker & Hale, LLP

(57) ABSTRACT

A solid oxide fuel cell stack includes a cell array in which M interconnector unit solid oxide fuel cells are connected in parallel to form a bundle, and N bundles are connected in series; a first plate-shaped current collecting member connected to a first bundle of the N bundles, the first current collecting member including a first terminal, and a second plate-shaped current collecting member connected to an $N^{th}$ bundle of the N bundles, the second current collecting member including a second terminal; and a first elastic insulating member adjacent to the first current collecting member, the first insulating member having a first opening, a second elastic insulating member adjacent to the second current collecting member, the second insulating member having another first opening, and the first terminal passes through the first opening and the second terminal portion through the other first opening.

18 Claims, 3 Drawing Sheets

SOLID OXIDE FUEL CELL STACK

CROSS-REFERENCE TO RELATED APPLICATION

This application claims priority to and the benefit of Korean Patent Application No. 10-2011-0081785, filed in the Korean Intellectual Property Office on Aug. 17, 2011, the entire contents of which is incorporated herein by reference.

BACKGROUND

1. Field

An aspect of the present invention relates to a solid oxide fuel cell (SOFC) stack.

2. Description of Related Art

Fuel cells may be classified into various kinds of fuel cells according to the kind of electrolyte utilized. Since fuel cells have various power ranges, usages and the like, a suitable fuel cell can be selected according to its desired usage. In solid oxide fuel cells (SOFCs), it is relatively easy to control the position of an electrolyte, and there is no risk of exhausting the electrolyte because of the fixed position of the electrolyte. Further, since SOFCs are strongly corrosion resistant, the lifetime of SOFCs is extended. For these reasons, SOFCs have come into the spotlight as fuel cells for distributed generation, commerce, and domestic use.

The voltage of a unit cell used in a fuel cell is not high as compared with that required for practical use. Therefore, in order to obtain a voltage required in actual use, the rated voltage and capacity of the fuel cell is designed by connecting a plurality of unit cells in series or parallel to one another.

SUMMARY

Aspects of embodiments of the present invention are directed toward a fuel cell stack having a current collecting structure suitable for a large capacity and/or capable of maintaining integrity of each unit cell in operation of the fuel cell while maintaining relatively uniform and high fastening pressure.

According to an embodiment for the present invention, a solid oxide fuel cell stack includes a cell array in which M (where M is a natural number) interconnector unit solid oxide fuel cells are connected in parallel to form a bundle, and N (where N is a natural number) bundles are connected in series. The stack includes a first plate-shaped current collecting member connected to a first bundle of the N bundles, the first current collecting member including a first terminal, and a second plate-shaped current collecting member connected to an $N^{th}$ bundle of the N bundles, the second current collecting member including a second terminal. The stack includes a first elastic insulating member adjacent to the first current collecting member, the first insulating member having a first opening, a second elastic insulating member adjacent to the second current collecting member, the second insulating member having another first opening. The first terminal portion passes through the first opening and the second terminal portion passes through the other first opening.

According to an embodiment for the present invention, the first insulating member may have a plate shape and may physically contact an outer surface of the first current collecting member.

According to an embodiment for the present invention, each solid oxide fuel cell of the unit cells may include a first electrode layer, an electrolyte layer, and a second electrode layer sequentially laminated from an inside thereof, and an interconnector connected to the first electrode layer and exposed to an outside of the unit cell, the interconnector being insulated from the second electrode layer.

According to an embodiment for the present invention, the first current collecting member may be in contact with the interconnectors of the unit cells of the first bundle of the N bundles and the second current collecting member may be in contact with the second electrode layers of the unit cells of the $N^{th}$ bundle of the N bundles.

According to an embodiment for the present invention, the stack may further include a first plate-shaped holder having a second opening and a second plate-shaped holder having another second opening, and the first terminal may pass through the second opening and the second terminal may pass through the other second opening. Each of the first and second holders may include fixing openings at its edge, and fixing members may be inserted into respective ones of the fixing openings and extending between the first and second holders to fix the first and second holders to each other.

According to an embodiment for the present invention, the lateral and longitudinal lengths of each of the first openings may be smaller than the lateral and longitudinal lengths of each of the second openings.

According to an embodiment for the present invention, at least one of the first and second current collecting members or the first and second holders may be formed of an alloy containing iron (Fe) and at least one of chromium (Cr) and nickel (Ni), and the fixing members may be formed of an alloy containing iron (Fe) and at least one of chromium (Cr) and nickel (Ni).

According to an embodiment for the present invention, the thermal expansion coefficient of each of the first and second current collecting members may be within 5% of that of the unit cells. The thermal expansion coefficient of each of the first and second current collecting members may be greater than that of each of the first and second insulating members and higher than that of each of the first and second holders.

According to an embodiment for the present invention, the thermal expansion coefficient of each of the first and second insulating members may be within 5% of that of the unit cells.

According to an embodiment for the present invention, the thermal expansion coefficient of each of the first and second holders may be within 5% of that of the unit cells.

According to an embodiment for the present invention, each of the first and second insulating members may be formed of a material containing at least one of $Al_2O_3$, $SiO_2$, or $ZrO_2$.

According to an embodiment for the present invention, the thickness of each of the first and second insulating members may be 1 to 3 cm.

According to an embodiment for the present invention, the density of each of the first and second insulating members may be 100 to 160 $kg/m^3$.

According to an embodiment for the present invention, each of the first and second terminals may have a plate shape.

According to an embodiment for the present invention, the first terminal portion protrudes perpendicularly from the first current collecting member, and the second terminal portion protrudes perpendicularly from the second current collecting member.

Therefore, according to aspects of embodiments of the present invention, the fuel cell stack may use an elastic insulator, thereby maintaining a relatively constant fastening pressure even while driving a fuel cell at high temperatures, thereby preventing or reducing the risk of breakdown of unit cells of the fuel cell stack when each component is expanded as a result of heat.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
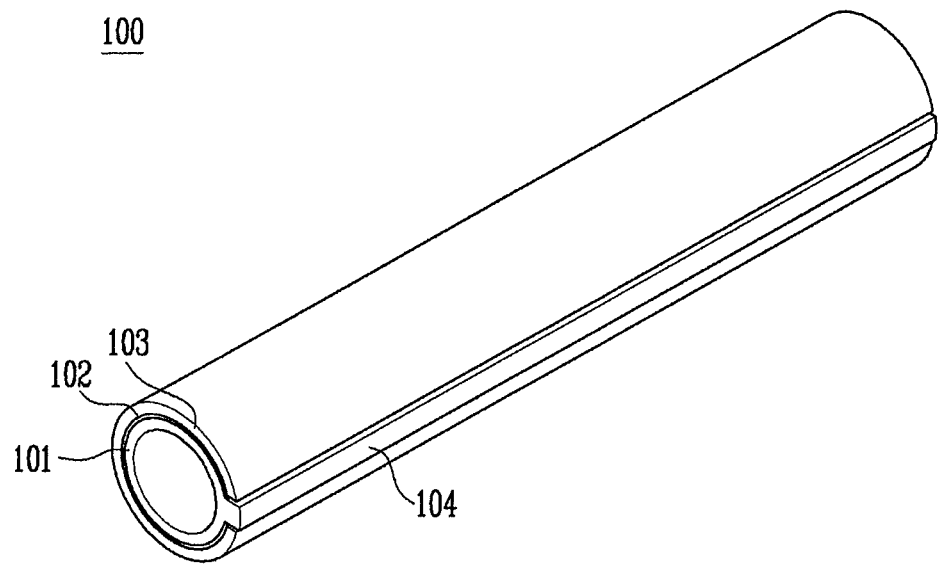
FIG. 1 is a perspective view schematically showing an interconnector-type unit cell.

In the following detailed description, only some exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. In the drawings, the thickness or size of layers may be exaggerated for clarity and are not necessarily drawn to scale.

A fuel cell includes a fuel cell module and a fuel converter (a reformer and a reactor) for reforming and supplying fuel to the fuel cell module. The fuel cell module is an assembly including a fuel cell stack for converting chemical energy into electric energy and thermal energy using an electrochemical method. That is, in one embodiment, the fuel cell module includes a fuel cell stack, a piping system through which fuel, oxide, coolant, and emission are moved, a wire through which electricity produced by the stack is moved, a part for controlling and/or monitoring the stack, and a part for taking measurements when an abnormal state of the stack (i.e., a malfunction) occurs.

An aspect of the present invention relates to a structure of a fuel cell stack, particularly, a fuel cell stack using a plurality of tubular and/or plate-shaped unit cells. Hereinafter, embodiments of the present invention will be described with reference to the accompanying drawings.

A unit cell will be described with reference to FIG. 1. FIG. 1 is a perspective view schematically showing an embodiment of an interconnector-type unit cell.

The unit cell 100 is a component that receives fuel reformed from a fuel converter (not shown) so as to produce electricity through an oxidation reaction. In the unit cell 100, a first electrode layer 101, an electrolyte layer 102 and a second electrode layer 103 are laminated radially from a central axis thereof. An interconnector 104 is exposed to an outside of the unit cell 100, and the interconnector 104 is electrically connected to the first electrode layer 101. In this instance, the interconnector 104 is insulated from the second electrode layer 103 in such a manner that the interconnector 104 has an insulating material provided between the interconnector 104 and the second electrode layer 103 or is spatially spaced apart from the second electrode layer 103. That is, the unit cell according to this embodiment may be formed to be an interconnector type (in terms of its current collecting method), and may be formed to have a tubular shape (in terms of its shape). However, the unit cell according to the present invention may be formed to have a flat-tubular shape in addition to the tubular shape. Here, the flat-tubular shape means a flat-tubular shape having a major diameter and a minor diameter (i.e., oval or elliptical shaped).

The unit cell 100 is formed as an anode-supported unit cell or cathode-supported unit cell as occasion demands. The unit cell according to the present invention may be formed as an anode-supported unit cell or cathode-supported unit cell, and the present invention is not limited thereto. That is, the first and second electrode layers 101 and 103 may be an anode and a cathode, respectively. Or, alternatively, the first and second electrode layers 101 and 103 may be a cathode and an anode, respectively.

The cathode is formed of a pure electron conductor or mixed conductor such as a $LaMnO_3$-based or $LaCoO_3$-based material, which has high ion and electron conductivity, stability under an oxygen atmosphere, and no chemical reaction with the electrolytic layer. The electrolytic layer serves as a path along which oxygen ions produced through the cathode and hydrogen ions produced through the anode are moved. The electrolytic layer is made of a ceramic material having a compactness such that gas does not penetrate the ceramic material. The anode is made of a ceramic material such as YSZ. Particularly, a metal ceramic complex (cermet), such as NiO-8YSZ or Ni-8YSZ, may be used as the anode. Cermet is relatively inexpensive, and has good stability under a high-temperature reduction atmosphere.

Figure 2:
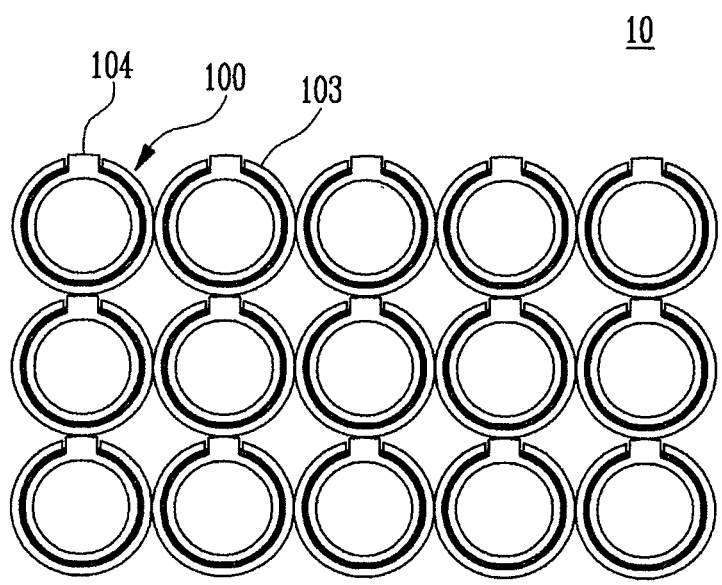
FIG. 2 is a plan view schematically showing a unit cell array having interconnector-type unit cells electrically connected to one another.

FIG. 2 is a plan view schematically showing a unit cell array having interconnector-type unit cells electrically connected to one another. As shown in FIG. 2, the cell array may be formed by connecting the unit cells 100 in series and/or parallel. In the unit cell 100, the interconnector 104 serves as a first electrode, and the second electrode layer 103 exposed to an outer circumferential surface of the unit cell 100 serves as a second electrode. Thus, when the unit cells 100 are connected in series, the unit cells 100 are connected so that the interconnector 104 of one unit cell 100 comes in contact with the second electrode layer 103 of another unit cell 100. On the other hand, when the unit cells 100 are connected in parallel, the unit cells 100 are connected so that the second electrode layers 103 of two unit cells 100 connected to each other come in contact with each other. FIG. 2 shows a cell array 10 in which the unit cells 100 are connected in 3S5P (3 series 5 parallel).

Figure 3:
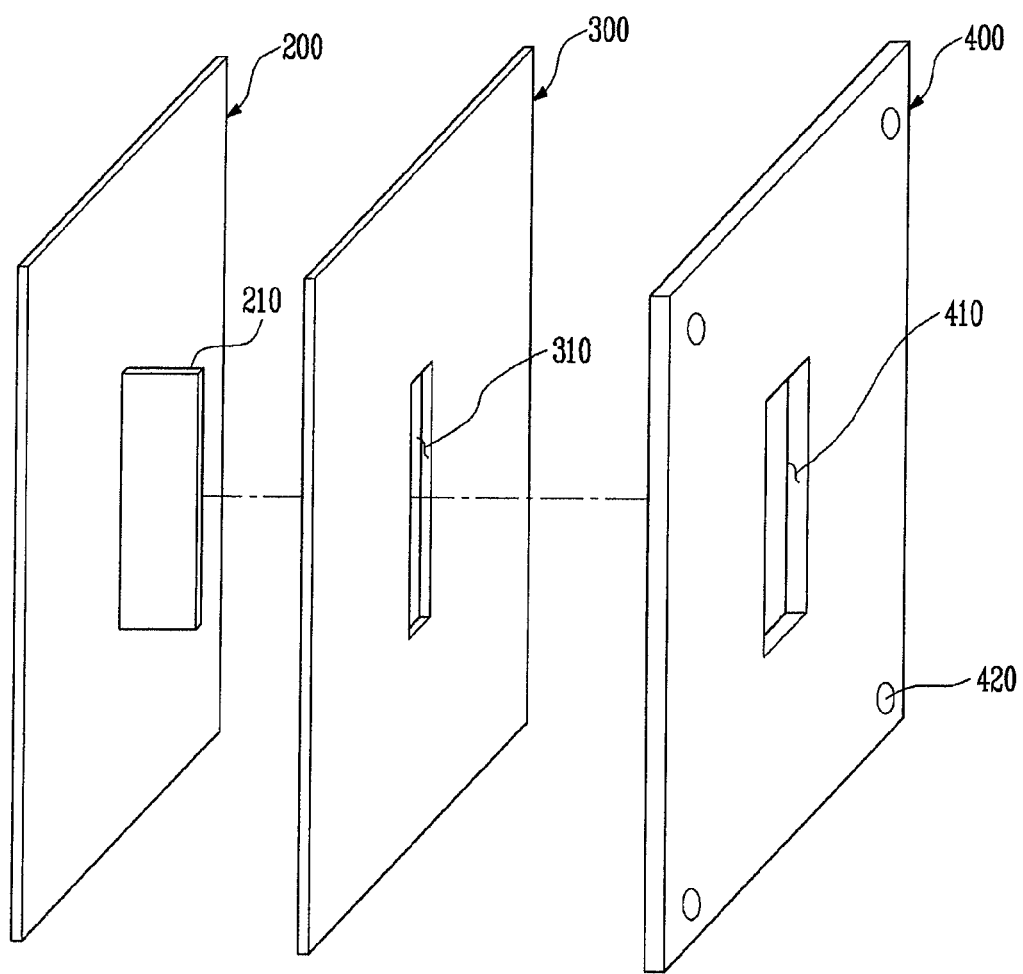
FIG. 3 is an exploded perspective view schematically showing a configuration for fixing unit cells according to an embodiment of the present invention.
Figure 4:
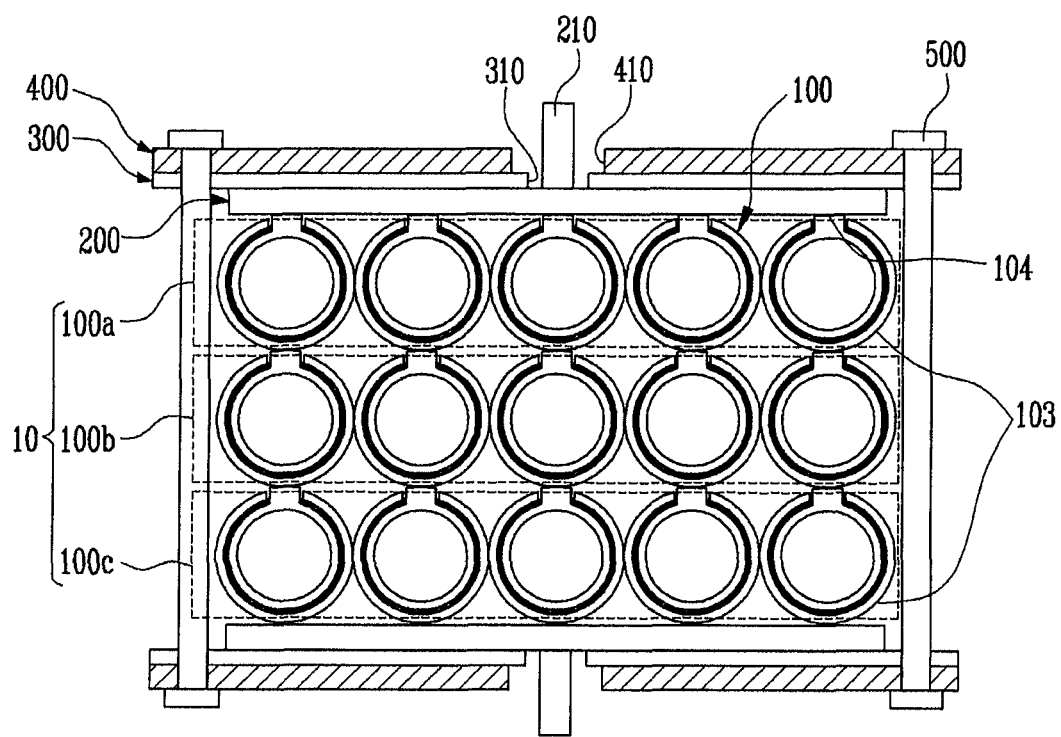
FIG. 4 is a cross-sectional view schematically showing a fuel cell stack according to an embodiment of the present invention.

A fuel cell stack will be described with reference to FIGS. 3 and 4. FIG. 3 is an exploded perspective view schematically showing a configuration for fixing unit cells according to an embodiment of the present invention. FIG. 4 is a cross-sectional view schematically showing a fuel cell stack according to the embodiment of the present invention.

A current collecting member 200 is formed in a plate shape. The current collecting member 200 is formed to have a plate shape and can collect more current than current collecting member formed to have a wire shape. A terminal portion 210 is formed on one surface of the current collecting member 200. Similarly, the terminal portion 210 is preferably formed to have a plate shape so that high current collected by the current collecting member 200 is effectively transferred to the outside through the terminal portion 210. The terminal portion 210 is provided to protrude in a vertical direction from one surface of the current collecting member 200. The current collecting member 200 and the terminal portion 210 may be formed of a single metal or alloy containing at least one of components generally used as a current collecting member, such as nickel (Ni) or silver (Ag).

In this embodiment, the current collecting member 200 is provided to the cell array in which the unit cells are arranged in the 3S5P. When assuming that five unit cells connected in parallel (P) constitute one bundle in the cell array in which the unit cells are arranged in the 3S5P, the cell array 10 of FIG. 4 has a structure in which three bundles 100a, 100b and 100c are connected in series (S). In this instance, the current collecting member 200 is provided with a pair of current collecting members. One of the current collecting members 200 serves as a first electrode by coming in contact with interconnectors 104 of unit cells constituting the first bundle 100a, and the other of the current collecting members 200 serves as a second electrode by coming in contact with second electrode layers 103 of unit cells constituting the third bundle 100c. Meanwhile, if the number of unit cells constituting one bundle is increased, the electric capacity of the fuel cell is increased. If the number of bundles is increased, the total voltage of the fuel cell is increased.

An insulating member 300 is formed as a plate-shaped electrical insulator. A first opening (e.g., through-hole) 310 passing through both surfaces of the insulating member 300 is included in the insulating member 300. The insulating member 300 includes a pair of insulating members, and the insulating members 300 are provided at the outsides of the current collecting members 200, respectively (e.g., in contact with an outer surface of the current collecting members 200). In this instance, the terminal portion 210 provided to the current collecting member 200 is exposed to the outside of the fuel cell by passing through the first opening 310.

The insulating member 300 is formed of a material having elasticity. Because the insulating member 300 has its own elasticity, the fastening pressure between the unit cells 100 and the current collecting member 200 may be maintained in a certain range under a high-temperature atmosphere in which the fuel cell is driven. Further, the insulating member 300 is provided between the current collecting member 200 made of metal and a holder 400, so as to serve as a buffer, so that it is possible to prevent or protect components near the insulating member 300 from being damaged.

The holder 400 is formed in a plate shape, and a second opening (e.g., through-hole) 410 passing through both surfaces of the holder 400 is formed in the holder 400. The holder 400 includes a pair of holders, and the holders are provided to outsides of the insulating members 300, respectively. In this instance, the terminal portion 210 is exposed to the outside of the fuel cell by passing through the first and second openings 310 and 410. The insulating member 300 is provided between the holder 400 and the current collecting member 200 so that the holder 400 and the current collecting member 200 are electrically insulated from each other. In order to prevent current from flowing in the terminal portion 210 and the holder 400 due to contact between the terminal portion 210 and the holder 400, the lateral and longitudinal lengths of the second opening 410 are preferably formed identical to or greater than those of the first opening 310.

Four fixing openings (e.g., holes) 420 are formed at an edge of the holder 400. Fixing members 500 are inserted into respective fixing openings opposite thereto so as to fix and maintain an interval between the holders 400 using a fastener (e.g., a screw), or the like.

Hereinafter, the material and thermal expansion coefficient of each of the components will be described.

In order to maintain a constant fastening pressure even though each of the components is thermally expanded in the driving of the fuel cell and maintain integrity of each of the component, the unit cell 100, the current collecting member 200, the insulating member 300, the holder 400 and the fixing member 500 are necessarily formed to have thermal expansion coefficients similar to one another. That is, the unit cell 100, the current collecting member 200, the insulating member 300, the holder 400 and the fixing member 500 are formed so that their thermal expansion coefficients are within 5% of one another. Thus, if possible, the components are formed of materials identical or similar to one another.

For this reason, the current collecting member 200, the holder 400, and the fixing member 500 may be formed of an alloy material containing iron (Fe) and at least one of chromium (Cr) and nickel (Ni). For example, the current collecting member 200, the holder 400, and the fixing member 500 may be formed of a heat-resistant alloy obtained by adding chromium, iron, or titanium to SUS 400 series, Crofer 22 APU, or nickel having oxidation resistance and a thermal expansion coefficient similar to that of the unit cell 100 at a high temperature. In an embodiment of the present invention, the current collecting member 200, the holder 400, and the fixing member 500 are formed of materials similar to one another, so that it is possible to prevent or reduce current collection efficiency from being reduced due to the formation of a gap between electrodes, caused by a difference in thermal expansion coefficient at a high temperature.

Because the insulating member 300 is a component for insulation, the insulating member 300 cannot be formed of a material identical or similar to those of the current collecting member 200 and the holder 400. Thus, the insulating member 300 is preferably formed of a material containing one or two or more of $Al_2O_3$, $SiO_2$, or $ZrO_2$ so as to have a thermal expansion coefficient similar to those of the current collecting member 200 and the holder and to have chemical stability at a high temperature.

The insulating member 300 preferably has a thickness of 1 to 3 cm so as to have a constant elasticity at a high temperature. When the insulating member 300 has a thickness of 1 cm or thinner, the insulating member 300 does not have sufficient elasticity, and therefore, the unit cell 100 may be damaged in the driving of the fuel cell. When the insulating member 300 has a thickness of 3 cm or thicker, the insulating member 300 absorbs even pressure for maintaining the fastening pressure, and unnecessary mobility is increased. Therefore, it is difficult to maintain structural stability.

The density of the insulating member 300 is preferably 100 to 160 $kg/m^3$ so as to apply uniform pressure to the outside and maintain elasticity.

The current collecting member 200 may be formed of a material having a thermal expansion coefficient slightly higher than that of each of the insulating member 300 and the holder 400. The current collecting member 200 may apply pressure to other components by being slightly more expanded inside the insulating member 300 and the holder 400 using a material such as SUS340 having an oxidation-resistant layer coated thereon. Thus, high fastening pressure can be maintained. In this case, a part of the pressure of the current collecting member 200 is slightly relieved due to deformation of the insulating member 300, so that it is possible to prevent or protect from breakdown of the fuel cell.

While the present invention has been described in connection with certain exemplary embodiments, it is to be understood that the invention is not limited to the disclosed embodi-

What is claimed is:

1. A solid oxide fuel cell stack, comprising:
a cell array in which M (where M is a natural number) interconnector unit solid oxide fuel cells are connected in parallel to form a bundle, and N (where N is a natural number) bundles are connected in series;
a first current collecting member connected to a first bundle of the N bundles, the first current collecting member including a first terminal, and a second current collecting member connected to an $N^{th}$ bundle of the N bundles, the second current collecting member including a second terminal; and
a first elastic insulating member adjacent to the first current collecting member, the first insulating member having a first opening at a portion away from its edges, a second elastic insulating member adjacent to the second current collecting member, the second insulating member having another first opening, and the first terminal passes through the first opening and the second terminal through the other first opening,
wherein each of the unit solid oxide fuel cells comprises a first electrode layer, an electrolyte layer, and a second electrode layer sequentially laminated from an inside of the solid oxide fuel cell, and an interconnector connected to the first electrode layer and exposed to an outside of the unit solid oxide fuel cell, the interconnector being insulated from the second electrode layer, and
wherein the first current collecting member is in direct contact with the interconnectors of the unit solid oxide fuel cells of the first bundle of the N bundles.

2. The solid oxide fuel cell stack according to claim 1, wherein the first insulating member physically contacts an outer surface of the first current collecting member.

3. The solid oxide fuel cell stack according to claim 1, wherein the second current collecting member is in contact with the second electrode layers of the unit solid oxide fuel cells of the $N^{th}$ bundles of the N bundles.

4. The solid oxide fuel cell stack according to claim 1, further comprising:
a first holder adjacent to the first insulating member and having a second opening and a second holder adjacent to the second insulating member and having another second opening, wherein the first terminal passes through the second opening and the second terminal passes through the other second opening, and each of the first and second holders has fixing openings at its edge; and
fixing members inserted into respective ones of the fixing openings and extending between the first and second holders to fix the first and second holders to each other.

5. The solid oxide fuel cell stack according to claim 4, wherein the lateral and longitudinal lengths of each of the first openings are smaller than the lateral and longitudinal lengths of each of the second openings.

6. The solid oxide fuel cell stack according to claim 4, wherein at least one of the first and second current collecting members or the first and second holders is formed of an alloy containing iron (Fe) and at least one of chromium (Cr) and nickel (Ni), and the fixing members are formed of an alloy containing iron (Fe) and at least one of chromium (Cr) and nickel (Ni).

7. The solid oxide fuel cell stack according to claim 6, wherein the thermal expansion coefficient of each of the first and second current collecting members is within 5% of that of the unit solid oxide fuel cells.

8. The solid oxide fuel cell stack according to claim 7, wherein the thermal expansion coefficient of each of the first and second current collecting members is higher than that of each of the first and second insulating members and higher than that of each of the first and second holders.

9. The solid oxide fuel cell stack according to claim 6, wherein the thermal expansion coefficient of each of the first and second insulating members is within 5% of that of the unit solid oxide fuel cells.

10. The solid oxide fuel cell stack according to claim 6, wherein the thermal expansion coefficient of each of the first and second holders is within 5% of that of the unit solid oxide fuel cells.

11. The solid oxide fuel cell stack according to claim 1, wherein each of the first and second insulating members is formed of a material containing at least one of $Al_2O_3$, $SiO_2$, or $ZrO_2$.

12. The solid oxide fuel cell stack according to claim 1, wherein the thickness of each of the first and second insulating members is 1 to 3 cm.

13. The solid oxide fuel cell stack according to claim 1, wherein the density of each of the first and second insulating members is 100 to 160 $kg/m^3$.

14. The solid oxide fuel cell stack according to claim 1, wherein each of the first and second terminals is planar.

15. The solid oxide fuel cell stack according to claim 14, wherein the first terminal protrudes perpendicularly from the first current collecting member, and the second terminal protrudes perpendicularly from the second current collecting member.

16. The solid oxide fuel cell stack according to claim 1, wherein the first current collecting member is planar and the second current collecting member is planar.

17. The solid oxide fuel cell stack according to claim 2, wherein the first insulating member is planar.

18. The solid oxide fuel cell stack according to claim 5, wherein the first holder is planar and the second holder is planar.

* * * * *